(12) United States Patent
Maul et al.

(10) Patent No.: US 7,937,968 B2
(45) Date of Patent: May 10, 2011

(54) METHOD FOR BONDING COMPONENTS MADE OF MATERIAL WITH A HIGH SILICIC ACID CONTENT

(75) Inventors: Armin Maul, Grebenheim/Nösberts (DE); Thorsten Herbert, Mömbris (DE); Jürgen Weber, Kleinostheim (DE); Waltraud Werdecker, Hanau (DE); Rolf Gerhardt, Hammersbach (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 1010 days.

(21) Appl. No.: 11/038,789

(22) Filed: Jan. 18, 2005

(65) Prior Publication Data

US 2006/0046075 A1    Mar. 2, 2006

(30) Foreign Application Priority Data

Aug. 28, 2004  (DE) .................. 10 2004 041 945
Nov. 11, 2004  (DE) .................. 10 2004 054 392

(51) Int. Cl.
*C03B 19/01*   (2006.01)
*C03B 19/06*   (2006.01)
*C03C 17/02*   (2006.01)
*C03C 27/00*   (2006.01)

(52) U.S. Cl. ............... 65/43; 65/17.3; 65/17.6; 65/36
(58) Field of Classification Search ............ 65/17.2, 65/43, 36, 48, 17.3, 17.4, 17.6; 428/426
See application file for complete search history.

(56) References Cited

U.S. PATENT DOCUMENTS 1,532,002 A * 3/1925 Thomson ............ 428/166
2,814,165 A * 11/1957 Goodwin ............ 65/43
(Continued)

FOREIGN PATENT DOCUMENTS

DE    29 23 011 A1    3/1980
(Continued)

OTHER PUBLICATIONS

Patent Abstracts of Japan for JP 63144151A; Published Jun. 16, 1988.

(Continued)

*Primary Examiner* — Jason L. Lazorcik
(74) *Attorney, Agent, or Firm* — Tiajoloff & Kelly LLP

(57) ABSTRACT

In a known method for bonding components made of material with a high silicic acid content by means of a substance to substance bond, a $SiO_2$-containing bonding mass is formed between connecting surfaces of the components. In order to provide for cost-efficient manufacture of a thermally stable composite, the invention proposes to generate a $SiO_2$-containing bonding mass that is generic with regard to the material with a high silicic acid content, comprising the following procedural steps: provision of a slurry containing amorphous $SiO_2$ particles; formation of a slurry mass between the connecting surfaces which are fixed in position with regard to each other; drying of the slurry mass; and solidification of the slurry mass by heating under formation of the $SiO_2$-containing bonding mass. A component assembly manufactured according to the method of the invention shows high temperature resistance and thermal fatigue resistance and can also be used in contamination-sensitive applications. The component assembly is characterized by an amorphous $SiO_2$-containing bonding mass, whose chemical composition is generic with regard to the material with the high silicic acid content of the basic material of the components, whereby the specific density of the $SiO_2$-containing bonding mass is at least $2.0\,g/cm^3$.

20 Claims, 5 Drawing Sheets

U.S. PATENT DOCUMENTS

| | | | | |
|---|---|---|---|---|
| 3,222,153 A | * | 12/1965 | Browne | 65/43 |
| 3,885,942 A | * | 5/1975 | Moore | 65/33.6 |
| 4,042,361 A | * | 8/1977 | Bihuniak et al. | 65/17.5 |
| 4,126,422 A | * | 11/1978 | Brandes | 23/293 R |
| 4,158,485 A | * | 6/1979 | Mueller et al. | 349/190 |
| 4,200,445 A | * | 4/1980 | Bihuniak et al. | 65/17.2 |
| 4,328,022 A | * | 5/1982 | Bonk et al. | 65/43 |
| 4,476,156 A | * | 10/1984 | Brinker et al. | 427/126.2 |
| 5,030,286 A | * | 7/1991 | Crawford et al. | 106/435 |
| 5,116,535 A | * | 5/1992 | Cochrane | 516/86 |
| 5,238,518 A | * | 8/1993 | Okubi et al. | 156/326 |
| 5,246,624 A | * | 9/1993 | Miller et al. | 516/86 |
| 5,316,564 A | * | 5/1994 | Nakamura et al. | 65/36 |
| 5,461,511 A | * | 10/1995 | Nakamura et al. | 359/514 |
| 5,563,743 A | * | 10/1996 | Nakamura et al. | 359/848 |
| 5,576,884 A | * | 11/1996 | Ise et al. | 359/514 |
| 5,617,262 A | * | 4/1997 | Ise et al. | 359/846 |
| 5,640,282 A | * | 6/1997 | Ise et al. | 359/846 |
| 5,653,777 A | * | 8/1997 | Semerdjian | 65/17.2 |
| 5,693,111 A | * | 12/1997 | Kadowaki et al. | 65/43 |
| 5,979,186 A | * | 11/1999 | Koppler et al. | 65/21.1 |
| 6,143,108 A | | 11/2000 | Risen, Jr. et al. | |
| 6,284,085 B1 | * | 9/2001 | Gwo | 156/273.7 |
| 6,412,306 B1 | * | 7/2002 | Flieger et al. | 65/32.2 |
| 6,484,540 B1 | | 11/2002 | Shimada et al. | |
| 6,638,982 B2 | * | 10/2003 | Brown | 516/86 |
| 6,998,776 B2 | * | 2/2006 | Aitken et al. | 313/512 |
| 7,602,121 B2 | * | 10/2009 | Aitken et al. | 313/512 |
| 2006/0093542 A1 | * | 5/2006 | Schumacher et al. | 423/335 |

FOREIGN PATENT DOCUMENTS

| | | |
|---|---|---|
| DE | 289 513 A5 | 5/1991 |
| DE | 102 43 954 B3 | 7/2004 |
| DE | 102 62 015 B3 | 7/2004 |
| EP | 0 473 104 A | 3/1992 |
| EP | 1 516 864 A | 3/2005 |
| GB | 2263178 A | 7/1993 |
| JP | 63069734 | 3/1988 |
| JP | 63144151 | 6/1988 |
| WO | WO 00/23389 | 4/2000 |

OTHER PUBLICATIONS

Patent Abstracts of Japan for JP 63069734A; Published Mar. 29, 1988.

* cited by examiner

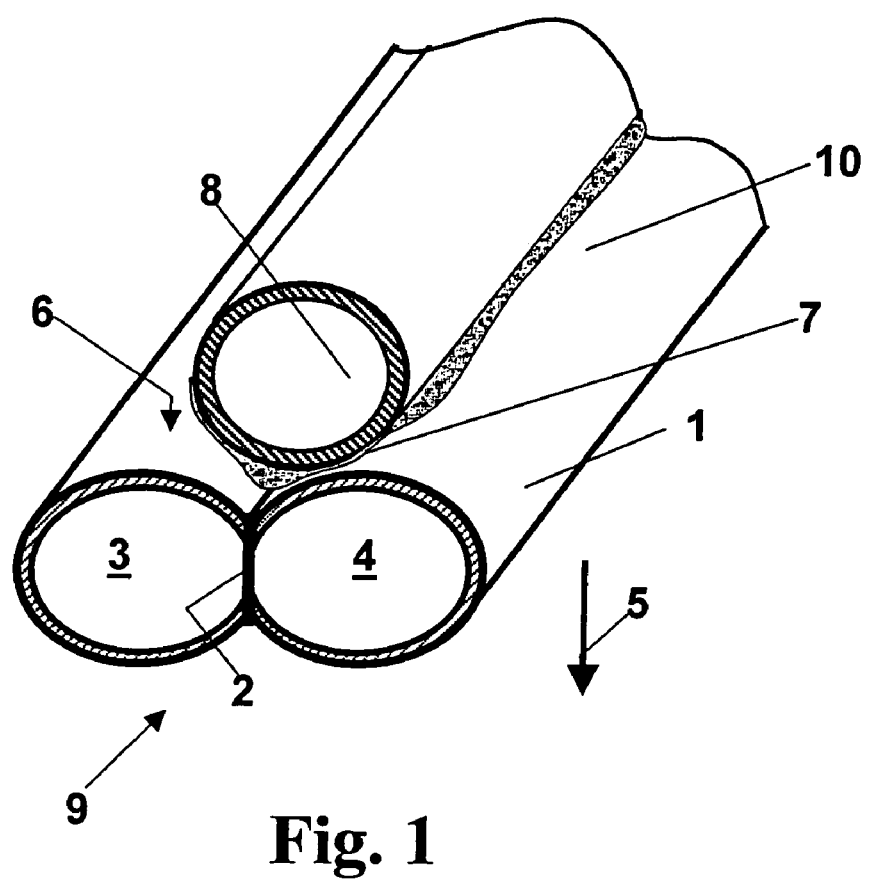
Fig. 1
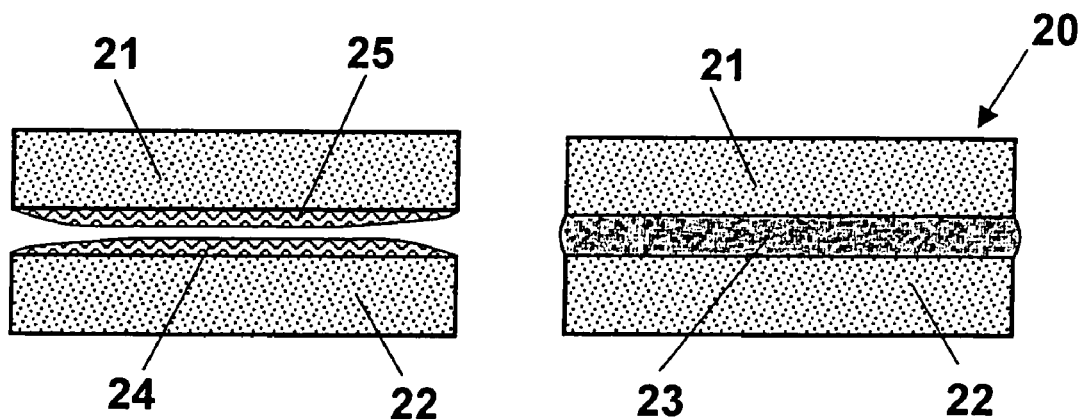
Fig. 2a   Fig. 2b

METHOD FOR BONDING COMPONENTS MADE OF MATERIAL WITH A HIGH SILICIC ACID CONTENT

The present invention relates to a method for bonding components made of material with a high silicic acid content by means of a substance to substance bond by forming a $SiO_2$-containing bonding mass between connecting surfaces of the components.

Moreover, the invention relates to a composite comprising at least two components made of material with a high silicic acid content, which are bonded to each other by means of a $SiO_2$-containing bonding mass.

Herein, the term, "material with a high silicic acid content", shall be defined to denote a doped or non-doped quartz glass with a $SiO_2$ fraction of at least 85%. This material shall hereinafter also be termed "quartz glass" for short. Quartz glass is characterized by a low thermal expansion coefficient, optical transparence over a wide range of wavelengths, and high chemical and thermal inertness.

Components made of quartz glass are being used for a multitude of applications, such as for example in the manufacture of lamps as cladding tubes, bulbs, covering plates or reflector carriers for lamps and radiators in the ultraviolet, infrared, and visible part of the spectrum, in chemical apparatus engineering or semiconductor manufacture in the form of reactors and apparatus made of quartz glass for the treatment of semiconductor components, carrier trays, jars, crucibles, protective shields or simple quartz glass components such as tubes, rods, plates, flanges, rings or blocks. In order to generate certain properties, the quartz glass is doped with other substances such as titanium, aluminum, boron, germanium.

Frequently, there is a need to connect quartz glass elements to each other, for example for the manufacture of quartz glass components of complex shape.

Commonly, this connection is provided by welding the components to each other. For example, EP 1 042 241 A1 describes a method for the butt-like welding of quartz glass tubes. Welding comprises melting the surfaces to be connected and pressing the softened surfaces against each other which can easily lead to undesired plastic deformation at the welding zone. Though it is possible to remove deformations of this kind by extensive after-treatment, some dimensional imperfections usually remain.

With regard to the manufacture of precision parts that are assembled from several quartz glass components, bonding techniques have therefor been proposed which include adhesive procedures using organic adhesive masses, but are resistant to low temperatures only, or diffusion welding procedures using activating intermediary layers.

A procedure of the latter type is described for example in DE 29 23 011 A1. In order to achieve a vacuum-tight connection of quartz glass elements, this reference proposes to vapor-deposit an aluminum layer with a thickness of 0.001 mm on the connecting surfaces, previously polished to be even, followed by pressing the connecting surfaces against each other at a pressure of 7 $Nmm^{-2}$, and then heat this composite in a vacuum to a temperature of approximately 630° C.

This bonding technique requires very costly treatment of the surface; the composite is incapable of resisting temperatures that are significantly higher than the melting temperature of aluminum.

Such a bonding procedure is known from DD 289 513 A5. To afford a dimensionally-stable and vacuum-tight connection of precision parts made of quartz glass, this reference proposes to use a glass solder based on lead-zinc borate. The glass solder consists of lead oxide, zinc oxide, boron oxide, and silica oxide at the following weight fractions: 76% PbO, 11% ZnO, 9% $B_2O_3$, and 2% $SiO_2$. A glass solder powder containing particles with a particle size between 1 μm and 70 μm is used to prepare an acetone-soluble paste, which is then applied to one of the connecting surfaces. The parts to be connected (tube and plate) are fixed in position with regard to each other and the connecting surfaces are pressed together firmly. This composite is then placed in a soldering furnace and subjected to a temperature treatment with a maximal temperature of 450° C. for a period of 3.5 hours. In the process, the glass solder melts and is converted to a crystalline phase with a higher melting temperature.

The substance to substance bond thus afforded is characterized by a low vacuum leakage rate—up to a temperature of 500° C. However, this bonded connection does not meet the particularly stringent requirements with regard to temperature resistance and thermal fatigue resistance of many applications of quartz glass in heat technology. In addition, the known bonded connection also fails to meet requirements with regard to purity and absence of contamination as exist for example in applications of semiconductor manufacture, optics, but also in the areas of chemistry, medicine, research, and analytical technology.

It is therefore the object of the present invention to provide a method providing for the cost-efficient manufacture of a thermally-stable composite of components made of material with a high silicic acid content.

It is another object of the invention to provide a component assembly composed from at least two bonded components made of material with a high silicic acid content, which component assembly is characterized by a high degree of reliability, temperature resistance, and thermal fatigue resistance, which can also be used in applications that are sensitive to contamination.

With regard to the method, the object is solved by the invention on the basis of the method described above in that a $SiO_2$-containing bonding mass is generated, which is generic with regard to the material with a high silicic acid content, comprising the following procedural steps:

(a) provision of a slurry containing amorphous $SiO_2$ particles;
(b) formation of a slurry mass between the connecting surfaces which are fixed in position with regard to each other;
(c) drying of the slurry mass; and
(d) solidification of the slurry mass by heating under formation of the $SiO_2$-containing bonding mass.

In the method according to the invention, the connection of the components is based on the presence of a generic $SiO_2$-containing bonding mass between the connecting surfaces. This bonding mass is produced through the use of an amorphous $SiO_2$ particles-containing slurry, a part of which is provided in the form of a slurry mass between the connecting surfaces, which are fixed in position with respect to each other, and whereby the slurry mass is subsequently solidified by drying and heating.

One technical challenge is to prevent the slurry mass from cracking during the drying and solidification. In order to achieve this, the method is based on a pourable or pasty slurry containing amorphous $SiO_2$ particles. These particles are subject to interactions with each other which stabilize the slurry mass even in its pasty and dry state and promote the sintering activity, which facilitates the solidification of the dried slurry mass at comparably low temperature under formation of a dense crack-free $SiO_2$-containing bonding mass. A further contribution to this is made by the amorphous structure of the $SiO_2$ particles which have a high inherent sintering activity.

The homogenized slurry is then applied in the form of a "slurry mass" to one connecting surface or both connecting surfaces, whereby the connecting surfaces are subsequently fixed in position with respect to each other or on each other. It is also possible to provide a slurry mass between connecting surfaces which are previously fixed in position with respect to each other.

The slurry mass is dried by removing moisture, for example at room temperature, by heating or by freeze-drying. Drying is performed in a separate procedural step prior to solidifying the slurry mass, or, alternatively, the drying according to procedural step (c) and the solidifying according to procedural step (d) are performed as a joint temperature treatment.

After drying, the slurry mass is solidified and compacted by heating it to a temperature leading to melting or sintering of the amorphous $SiO_2$ particles and formation of a crack-free $SiO_2$-containing bonding mass consisting of opaque, partly opaque and partly transparent or completely transparent highly silicic acid-containing glass.

Another technical challenge is the manufacture of a stable $SiO_2$-containing bonding mass providing a stable and reliable connection between the components even upon temperature changes. In this regard, a special focus is on the thermal expansion coefficient $SiO_2$-containing bonding mass and its temperature dependence compared to the thermal expansion coefficient or coefficients of the components to be connected.

In this regard, the use of a $SiO_2$-containing bonding mass that is generic with regard to the material with a high silicic acid content plays an important role. Herein this shall mean that the $SiO_2$ content of the bonding mass differs from that of the highly silicic acid-containing components by maximally 5 wt-%, preferably by maximally 3 wt-%. The use of "generic material" for the formation of the bonding mass has the following effects:
- on the one hand, it facilitates the approximation, to the extent possible, of the thermal expansion coefficients of the quartz glass of the components and of the bonding mass, and, associated with this, particularly good adhesion of the solidified $SiO_2$-containing bonding mass to the connecting surfaces and, particularly, a high thermal fatigue resistance of this composite;
- on the other hand, contamination of the quartz glass of the connected components or their operative environment by foreign substances present in the generic material is thus prevented or reduced;
- and, in addition, crystallization of the generic $SiO_2$-containing bonding mass during solidification is thus prevented or at least minimized. Crystallization in the area of the bonding mass would weaken the bonded connection.

The amorphous $SiO_2$ particles used to form the slurry consist of synthetically produced $SiO_2$ particles or are produced on the basis of purified naturally-occurring raw material.

In a first preferred variant of the method, the solidification of the slurry mass comprises a sintering of the slurry mass under formation of an at least partially opaque solidified bonding mass.

Compared to vitrification to the extent of complete transparence, sintering requires comparably lower heating temperatures and/or shorter heating times. This favors the maintenance of the dimensional accuracy of the component assembly to be produced, reduces the energy requirements, and prevents detrimental thermal effects on the components to be connected and crystallization in the area of the bonding mass.

Experience has shown that even just sintering (and not only complete vitrification) is sufficient to achieve sufficient mechanical resistance of the $SiO_2$-containing bonding mass for most applications.

The degree of compaction depends on the sintering temperature and sintering time. The higher the temperature, the shorter the sintering time can be, and vice versa. A common and preferred temperature treatment for sintering of the slurry mass comprises heating at a temperature in the range between 800° C. and 1.450° C., preferably at a temperature below 1.300° C.

It has proven to be favorable to perform the sintering in a sintering furnace, in which the components to be connected are placed.

The homogeneous heating of the entire component assembly in a sintering furnace reduces the formation of strain and prevents deformation of the composite.

In a second, similarly preferred variant of the procedure, the solidification of the slurry mass comprises vitrification under formation of an at least partly transparent solidified $SiO_2$-containing bonding mass.

Complete vitrification of the $SiO_2$-containing bonding mass (in contrast to sintering) is preferred when particularly stringent requirements on the tightness, mechanical strength, absence of particles, and chemical inertness must be met by the composite, when optical transparence is required in this area for technical reasons, or for purely aesthetic reasons. In this case, the $SiO_2$-containing bonding mass contains no or few pores and possesses high density at a level similar to that of the silicic acid-containing components.

However, usually it is sufficient to vitrify areas of the $SiO_2$-containing bonding mass that are close to the surface. Provided these vitrified areas connect the connecting surfaces to each other, they contribute to increased mechanical firmness and the tightness of the composite even if the $SiO_2$-containing bonding mass otherwise is pore-containing and opaque.

Helium leakage tests have shown that vacuum-tightness levels up to $10^{-9}$ bar can be realized without any problem in component composites which are shaped like hollow bodies and manufactured by means of the latter variant of the method according to the invention.

Vitrification is preferably performed through the use of a heat source whose maximal heating effect can be limited locally to the slurry mass.

Hereby, the effect of the high temperature required for vitrification can be limited locally to the slurry mass to be vitrified, and therefore plastic deformations can be prevented or reduced. It is preferable to use burners or infrared lasers (for example $CO_2$ lasers) for this purpose.

In the case of a preceding sintering step, it is preferable to utilize the residual heat and vitrify the component assembly while it is still hot. This contributes to the saving of energy and reduces the formation of strains.

In a particularly preferred procedure, amorphous $SiO_2$ particles with an $SiO_2$ content of at least 99.9 wt-% are used in procedural step a).

The solid of the slurry prepared using such particles consists of at least 99.9 wt-% $SiO_2$. Binding agents or similar additives are not provided. In this regard, this is a generic starting material for a component assembly made of non-doped quartz glass. This starting material is not associated with a risk of contamination or crystallization.

It has proven advantageous for the particle sizes of the amorphous $SiO_2$ particles to be in the range of up to 500 μm, preferably up to 100 μm, whereby amorphous $SiO_2$ particles with particle sizes in the range between 1 μm and 50 μm account for the majority of the weight.

Amorphous $SiO_2$ particles in this size range and of this size distribution show advantageous sintering behavior and comparably little shrinking upon drying. The coarser particles contribute to a high solids content of the slurry, which leads to lower relative shrinkage of the slurry mass. As a result of the interactions illustrated above, which may even lead to the formation of molecular $SiO_2$ bonds, the finer particles act similar to a binding agent promoting the sintering and vitrification behavior. Experience indicates that, with a slurry of this type, a slurry mass with high greenbody density can be generated and dried and solidified without cracks forming.

A contribution to this is made if the amorphous $SiO_2$ particles are generated by wet comminution of amorphous $SiO_2$ starting grains.

In the process, the desired particle size distribution is set by means of the slurry homogenization process, whereby the amorphous $SiO_2$ particles are reduced in size during the homogenization from comparably coarse grains with diameters for example in the range between 200 μm and 5,000 μm depending on their degree of solidification. During wet comminution, amorphous $SiO_2$ particles of any size are produced in the slurry, including sizes which form the bonds described above already in the slurry, which improves the stability of the slurry mass.

It is advantageous for the solids content of the slurry during the generation of the slurry mass between the connecting surfaces to be at least 65 wt-%, preferably at least 80 wt-%, and particularly preferable at least 85 wt-%.

During the application or introduction of the slurry mass, a high solids content reduces the shrinkage during drying and solidification, and thereby reduces the formation of strains in the $SiO_2$-containing bonding mass and, in addition, the dimensional stability and dimensional accuracy of the composite. However, there may be arguments in favor of a low viscosity slurry depending on which procedure for the application of the slurry is selected.

For the application of the slurry, the known procedure are basically suitable, such as spraying, electrostatically-supported spraying, flooding, centrifugation, laying on (painting), troweling. Especially in application procedures that are well-suited for even coverage of large areas by means of immersion or spraying, comparably low slurry viscosities are advantageous.

Roughness and unevenness of the connecting surfaces do not necessarily have disadvantageous effects in the method according to the invention. Rather, a certain degree of surface roughness improves the adhesion of the slurry mass and $SiO_2$-containing bonding mass. In addition, it is easy to apply the slurry mass between the connecting surfaces thick enough such that costly processing of these surfaces in an earlier step can be prevented.

Aside from amorphous, dense $SiO_2$ particles, the slurry can also contain other amorphous $SiO_2$ starting material.

For example, it has proven favorable for at least part of the amorphous $SiO_2$ particles to be provided in the form of porous granulate particles made of agglomerates of nano-scale, amorphous, synthetically-produced $SiO_2$ primary particles with a mean primary particle size of less than 100 nm.

The porous granulate consists of agglomerates of nano-scale, amorphous, synthetically-produced $SiO_2$ primary particles with a mean primary particle size of less than 100 nm. Primary particles of this type are obtained by flame hydrolysis or oxidation of silicon compounds. Upon granulation, agglomeration of the fine-particulate $SiO_2$ primary particles leads to the formation of the coarser granulate particles. As a result, some compaction and solidification is initiated as early as in the slurry mass which later favors the sintering and vitrification; the compaction and solidification is based on a certain degree of solubility and mobility of individual primary particles in the slurry, which contributes to the formation of so-called "sintering necks" between adjacent amorphous $SiO_2$ particles in the slurry mass. When the $SiO_2$-enriched liquid phase in the area of these "necks" is dried, these necks solidify and lead to a firm connection between the individual amorphous $SiO_2$ particles, and to compaction and solidification of the slurry mass, which simplifies the subsequent sintering. The porosity of the granulates and the associated large specific surface effect high sintering activity.

Moreover, the slurry can contain precursor components for the formation of amorphous $SiO_2$ particles. These are hydrolyzable silicon compounds similar to those used in sol-gel procedures for the manufacture of $SiO_2$. However, if present at high concentration, these lead to relatively high shrinkage of the slurry mass, which limits the fraction of precursor components of this type in the slurry.

It has been particularly favorable to set the pH value of the slurry to a value in the range between 3 and 5.5.

The acidic pH value improves the cross-linking reactions of the amorphous $SiO_2$ particles with each other and simplifies the thermal solidification of the slurry mass.

During wet comminution, the gradual dissolution of the amorphous $SiO_2$ particles of the slurry—up to the solubility limit—lowers the pH value automatically. However, especially for acceleration of the process, a procedure is preferred, in which the pH value of the slurry is set by adding an acid or a base.

It has proven favorable to provide for an exposure time between the formation of the slurry mass between the connecting surfaces being fixed in position with respect to each other, and the drying of the slurry mass.

This improves the adhesion of the slurry mass on the connecting surfaces and strengthens the bonds between the amorphous $SiO_2$ particles. Presumably, this effect is due to cross-linking reactions which proceed, and are aided by the moisture that is present, during the exposure time between amorphous $SiO_2$ particles of the still moist slurry mass and the $SiO_2$ of the connecting surfaces of is the components. The duration of the exposure time depends on the quantity of slurry mass and is on the order of a few minutes to several hours.

With regard to the component composite, the object specified above is solved by the invention based on the composite mentioned above in that the $SiO_2$-containing bonding mass is amorphous and possesses a chemical composition that is generic with regard to the material with a high silicic acid content, and in that the specific density of the $SiO_2$-containing bonding mass is at least 2.0 g/cm$^3$.

The at least two components of the component assembly according to the invention are assembled by means of an $SiO_2$-containing bonding mass that is "generic" with regard to the material of the components. This bonding mass is preferably produced by means of the procedure according to the invention as described above using a slurry containing amorphous $SiO_2$ particles.

The $SiO_2$-containing, amorphous bonding mass consists of a material that is generic with regard to the assembled components such that noticeable differences in the expansion coefficient and its temperature dependence as well as contamination and crystallization risks are prevented. With respect to the definition of the term, "generic", reference shall be made to the earlier comments regarding the procedure according to the invention.

The Cristobalit fraction of the $SiO_2$-containing bonding mass is max. 1 wt-%, since otherwise the formation of crystals would weaken the bonded connection.

The amorphous $SiO_2$-containing bonding mass consisting of a generic material imparts particularly good adhesion and high thermal fatigue resistance properties on the component assembly according to the invention, which is suitable also for contamination-sensitive applications, and which also meets stringent dimensional accuracy requirements. The component assembly according to the invention possesses one or multiple bonding sites. The application options are multifarious. Examples include wafer carriers, which must meet stringent requirements with regard to their dimensional accuracy, thermal stability, and absence of contamination, or structural elements made of quartz glass assembled from simple elements, such as frames for telescopes, reflectors or the like, which are characterized by their low weight or by a low thermal expansion coefficient. It is advantageous for containers, such as reactor shells for performing chemical and physical processes or tanks for the reception of liquids, gases, and solids, to consist of the component assembly according to the invention. Aside from these and the above-mentioned utilization options in lamp manufacture, semiconductor manufacture or laboratory equipment, the use of component composites according to the invention also lends itself in the area of fiber optics, for example for connecting parts of a preform for optical fibers to each other or bond mounting elements made of quartz glass to such a preform, for the manufacture of optical waveguide components, such as plugs, couplers, branch-offs, connectors.

It has proven favorable for the specific density of the $SiO_2$-containing bonding mass to be at least 2.1 g/cm$^3$.

The bonding site of a component assembly of this type is characterized by particularly high mechanical firmness, chemical inertness, gas-tightness, and absence of particles.

In a particularly preferred embodiment of the component assembly according to the invention, the $SiO_2$-containing bonding mass comprises an $SiO_2$ fraction of at least 99.9 wt-%.

In this regard, this is a bonding site of a generic material for a component assembly made of non-doped quartz glass. A bonding site of this type is not associated with a contamination risk.

In a first preferred refinement of the component assembly according to the invention, the $SiO_2$-containing bonding mass is partly or completely transparent.

A component of this type is preferred when particularly stringent requirements with regard to the tightness, firmness, absence of particles, and chemical inertness of the composite exist or when optical transparence is required in this area for technical reasons or desired for aesthetic reasons. In this case, the $SiO_2$-containing bonding mass contains no or few pores and possesses high density at a similar level as that of the components having an high silicic acid-content.

Usually, it is sufficient for only the areas of the $SiO_2$-containing bonding mass that are close to the surface to be completely vitrified and transparent. These connect the connecting surfaces of the components to each other and thus contribute to the mechanical firmness, tightness, and absence of particles from the composite.

In a second, similarly preferred refinement of the component assembly according to the invention, the $SiO_2$-containing bonding mass is opaque.

A component of this type is preferred especially if stringent requirements on the dimensional accuracy of the component assembly to be produced must be met. The opacity (translucence) of the $SiO_2$-containing bonding mass is attained by a sintering process with a comparably low energy requirement (temperature-time program).

In a particularly preferred embodiment of the component composite, the opaque $SiO_2$-containing bonding mass is provided in the gap between two quartz glass tubes which are arranged coaxial with respect to each other.

Herein, the opaque $SiO_2$-containing bonding mass serves, on the one hand, for fixation in position of the quartz glass tubes with respect to each other and imparts on the tube composite the properties of an opaque cylinder with regard to the translucence and shielding of heat radiation, even if one or both quartz glass tube(s) is/are transparent. This is of advantage especially in the case of quartz glass tubes with a large volume, which can only be obtained by heat forming of standard-sized tubes and loose all or a large part of their translucence in the process.

In the following, the invention is illustrated in more detail by means of embodiments and one drawing. The following is shown in schematic representation in the figures:

FIG. 1 shows an embodiment of the component assembly according to the invention in the form of quartz glass tubes which are connected to each other by their longitudinal sides;

FIG. 2a shows the assembly of two quartz glass plates in accordance with the method according to the invention;

FIG. 2b shows the component assembly obtained by means of the procedural step shown in FIG. 2a, in the form of two quartz glass plates which are placed on top of each other by their flat sides;

Figure 7:
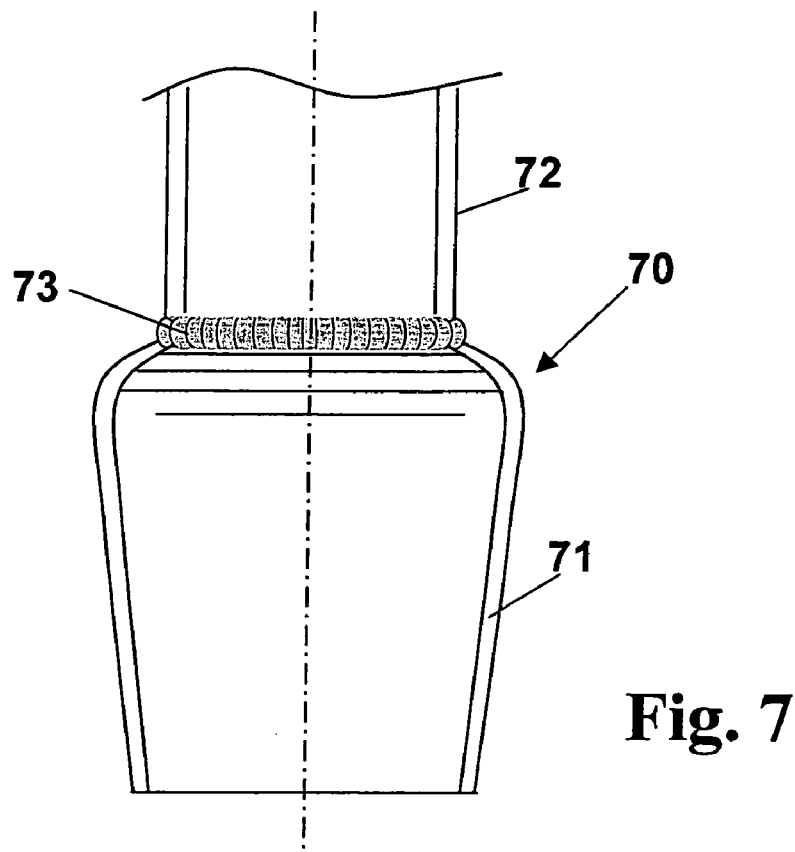
Figure 8:
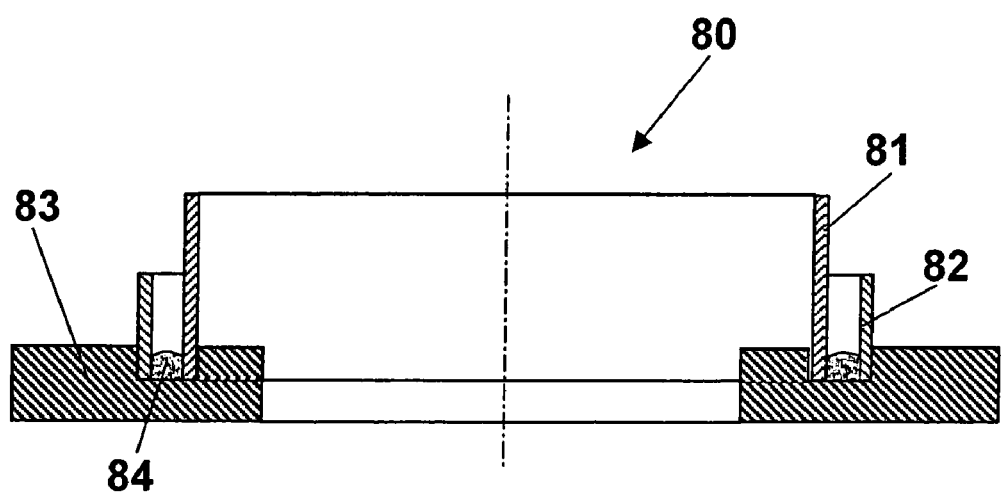
Figure 9:
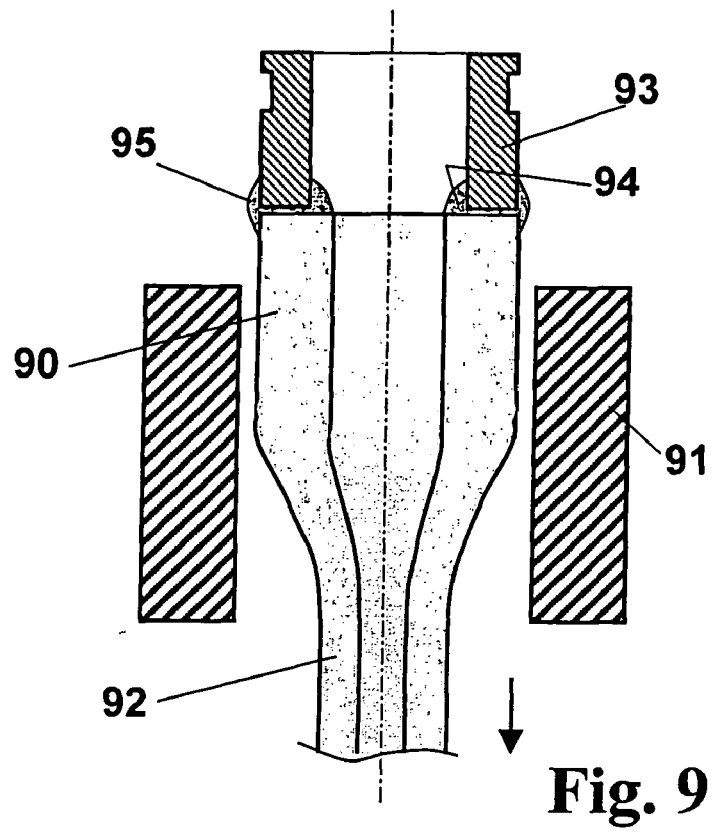
Figure 10:
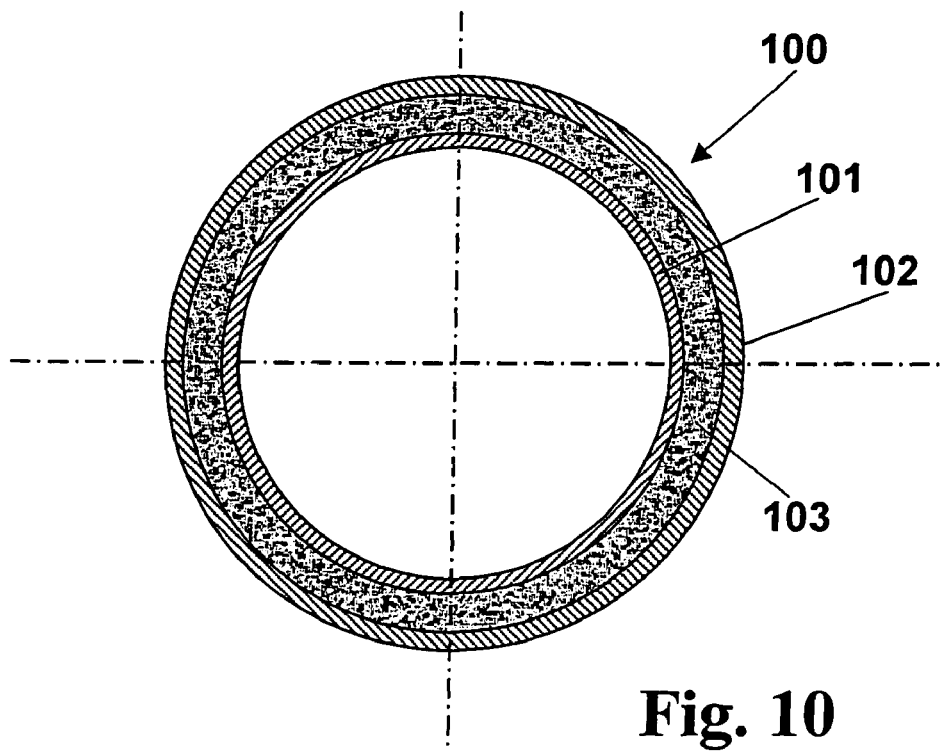

FIG. 7 shows a side view of a laboratory device with a conical ground joint assembled from individual elements, FIG. 8 shows a side view of a section of a component assembly according to the invention in the form of quartz glass tubes, which are arranged coaxial with respect to each other and are fixed in position on a quartz glass ring, FIG. 9 shows another embodiment of the component assembly according to the invention, in which a holder made of quartz glass is connected to a preform for optical fibers, and FIG. 10 shows a radial cross-section of another embodiment of the component assembly according to the invention in the form of an opaque tube.

1. Preparation of the Slurry

A homogeneous stabilized basic slurry is prepared. To prepare a batch of 10 kg of basic slurry, 1.8 kg of deionized water whose conductivity is less than 3 µS and 8.2 kg of an amorphous quartz glass granulate made of natural raw material with grain sizes in the range between 250 µm and 650 µm and an $SiO_2$ content of 99.99% are mixed in a quartz glass-lined rotary drum grinder with a volume of approximately 20 liters.

This mixture is then comminuted by means of quartz glass grinding beads on a roller bracket at 23 rpm for a period of 3 days until a homogenous stabilized base slurry with a solids content of 82% wt-% is obtained. During the comminution process, the dissolving $SiO_2$ reduces the pH to a value of approximately 4.

The amorphous $SiO_2$ particles in the base slurry obtained after wet comminution of the quartz glass granulate have a particle size distribution that is characterized by a $D_{50}$ value of approximately 5 μm and a $D_{90}$ value of approximately 23 μm.

Additional amorphous $SiO_2$ granulate with a mean grain size of approximately 5 μm is then added to the basic slurry thus obtained until the solids content is 90 wt-%. The mixture is then homogenized in a rotary drum grinder for 12 hours at 25 rpm. The slurry thus obtained has a solids content of 90% wt-% and a density of almost 2.0 g/cm³.

The basic slurry is used in this state for the manufacture of an adhesive connection as shall be described in more detail in the following.

2. Preparation of an Adhesive Connection Using the Slurry

FIG. 1 shows in a schematic representation a so-called "twin tube" made of quartz glass. This twin tube consists of a cladding tube 1 whose cross-section is figure 8-shaped and which is subdivided into two sub-spaces 3, 4 by a central fin 2. The sub-spaces 3, 4 serve to receive one heating spiral each, whereby the electrical connections are guided out of the cladding tube 1 through crimps on its ends (not shown in FIG. 1). The main direction of the light radiation of the twin tube 9 is downwards in the embodiment shown as indicated in a symbolic fashion by the direction arrow 5. On the upper side 6 of the twin tube 9 facing away from the main direction of the light radiation 5, it is intended to bond a quartz glass cooling tube 8 whose longitudinal axis extends parallel to the longitudinal axis of the twin tube 9.

For this purpose, the surfaces of the cooling tube 8 and twin tube 9 are cleaned with alcohol and then cleaned with 30% hydrofluoric acid in order to remove other surface contaminations, in particular due to alkaline and alkaline earth compounds.

Subsequently, the slurry mass described above is introduced into the trough between the two tube-halves of the twin tube 9 and then the cooling tube 8 is pressed onto this such that it is introduced into the trough, whereby a small quantity of slurry mass is squeezed out in upward direction and thus forms a slurry build-up 10 along the contact surface. The bonding mass 7 between the contact surfaces is a few tenths of a millimeter thick.

This arrangement is allowed to rest for approximately 6 hours in an air atmosphere, during which the slurry layer 7 dries slowly. Complete drying is achieved through the use of an IR radiator in an air atmosphere. After drying, the bonding mass 7 is free of cracks and approximately 0.4 mm thick in the area of the contact surfaces, and somewhat thicker in the area of the trough and slurry build-up 10.

The dried bonding mass 7 is then vitrified in a sintering furnace in an air atmosphere. The heating profile for vitrification comprises a heating ramp during which the bonding mass 7 is heated from room temperature to a heating temperature of 1,300° C. over the course of two hours. The bonding mass 7 is then kept at this heating temperature for two hours. After this treatment, the bonding mass 7 is completely sintered, optically opaque, and has a mean specific density of approximately 2.12 g/cm³.

The composite thus prepared is then removed from the sintering furnace while it is still hot and the area around the sintered slurry build-up 10 is vitrified by means of a oxyhydrogen gas burner. For this purpose, the oxyhydrogen gas burner is moved along the free surface of the sintered slurry build-up 10 to heat the build-up until it is completely transparent. The remaining area of the sintered bonding mass 7—between the cooling tube 8 and the twin tube 9—remains opaque such that the mean specific density does not change significantly.

Subsequently, the still hot composite of twin tube 9 and cooling tube 8 is placed in the sintering furnace, which is still heated to a temperature of 1,100° C., and slowly allowed to cool therein. The first cooling ramp has a cooling rate of 5° C./min and ends at a furnace temperature of 1,050° C., the second cooling ramp has a cooling rate of 10° C./min and ends at a furnace temperature of 950° C. The further cooling proceeds uncontrolled inside the closed furnace. The relatively slow cooling anneals the component assembly such that existing mechanical strains are reduced or removed and the formation of strain due to cooling is prevented.

The composite consisting of twin tube 9 and quartz glass cooling tube 8 is mechanically stable and characterized by its high thermal fatigue resistance even at operating temperatures above 1,000° C.

FIG. 2b shows in a schematic representation a composite body 20 comprising a lower quartz glass plate 22 and an upper quartz glass plate 21 which are connected to each other by means of an opaque $SiO_2$-containing intermediary layer 23 with a thickness of 1 mm. The plates are each 2 mm thick and square in shape with edges 200 mm in length.

The opaque intermediary layer 23 serves for example as a transmission barrier for heat radiation. Quartz glass components—such as flanges—in high temperature applications are often made completely or partly of opaque quartz glass to block heat radiation. For the purpose of cleaning, the components usually are etched with hydrofluoric acid-containing chemicals. However, opaque quartz glass has a low etching resistance such that the serviceable life of such opaque quartz glass components ends after relatively few cleaning cycles. For this reason, transparent quartz glass is melted onto the opaque surface areas of the components. This is a hot process which tends to cause deformation of the component such that a costly after-treatment is required.

The composite body 20 according to the invention as shown schematically in FIG. 2b represents such an opaque component of this type that is covered by transparent quartz glass on its both sides. It is suited to replace components of this type which are costly to produce until now, whereby the transparent layers 21, 22 can easily be applied also in thick layers.

In order to prepare the composite body 20, the plates 21, 22 are first degreased and cleaned as described by means of Example 1. Subsequently, the slurry described above is applied by spraying to the upper side of the lower quartz glass plate 22 and the lower side of the upper quartz glass plate 21 in the form of one slurry layer 24, 25 each which each is approximately 0.8 mm thick, whereby the low viscosity slurry is sprayed on using a spraying nozzle. The spraying process is terminated as soon as about even coverage is achieved, as is shown in FIG. 2a in a schematic fashion.

Immediately thereafter, the upper plate 21 is placed on the lower plate 22, whereby fixation of the two plates 21, 22 with respect to each other is achieved. This arrangement is allowed to rest for approximately 6 hours in an air atmosphere, during which the slurry layer 24, 25 dries slowly. Complete drying is achieved through the use of an IR radiator in an air atmosphere. The dried slurry layer 24, 25 is free of cracks and maximally approximately 1.4 mm thick.

After drying of the slurry layer, the composite body 20 is sintered in a sintering furnace in an air atmosphere. The heating profile for sintering comprises a heating ramp during which the slurry layer is heated from room temperature to a heating temperature of 1,250° C. over the course of one hour. The composite body 20 is then kept at this heating temperature for two hours. The slurry layer thus gives rise to a sintered, but still opaque intermediary layer 23, which firmly connects the two quartz glass plates 21, 22 and consists of generic material with regard to the quartz glass plates 21, 22, and has a mean specific density of approximately 2.10 g/cm$^3$.

The composite body 20 thus prepared is then allowed to cool slowly in the sintering furnace as described above by means of Example 1.

The plate-shaped composite body 20 thus prepared is opaque and 5 mm thick. It consists of three layers 21, 22, 23, of which the middle layer 23 is approximately 1 mm thick and accounts for the opacity and is covered on both sides by layers 21, 22 made of dense and tight, transparent quartz glass with a thickness of 2 mm each, which is characterized by its high etching resistance. In addition, the composite body 20 is thermally stable, characterized by high thermal fatigue resistance even at operating temperatures above 1,000° C., and generates absolutely no problems related to particles.

The method described above is also well-suited for the manufacture of a composite body that consists completely of transparent quartz glass. For this purpose, it is only necessary to completely vitrify the intermediary layer 23 rather than to sinter it. For this purpose, the composite body is vitrified in a vitrification furnace in an air atmosphere after drying of the slurry layer. The heating profile for vitrification comprises a heating ramp during which the slurry layer is heated from room temperature to a heating temperature of 1,350° C. over the course of two hours. The composite body is then kept at this heating temperature for two hours. The slurry layer thus gives rise to a sintered, transparent intermediary layer of generic material, which firmly connects two quartz glass plates and has a mean specific density of approximately 2.2 g/cm$^3$. In this fashion, it is not only possible to increase the thickness of quartz glass plates, but also to build-up quartz glass blocks.

Further embodiments of the composite component according to the invention are shown schematically in FIGS. 3 to 10, whereby the bonding technique using an SiO$_2$ slurry, as described in more detail in FIGS. 1 and 2, is used in each case to connect the components to each other.

Figure 3:
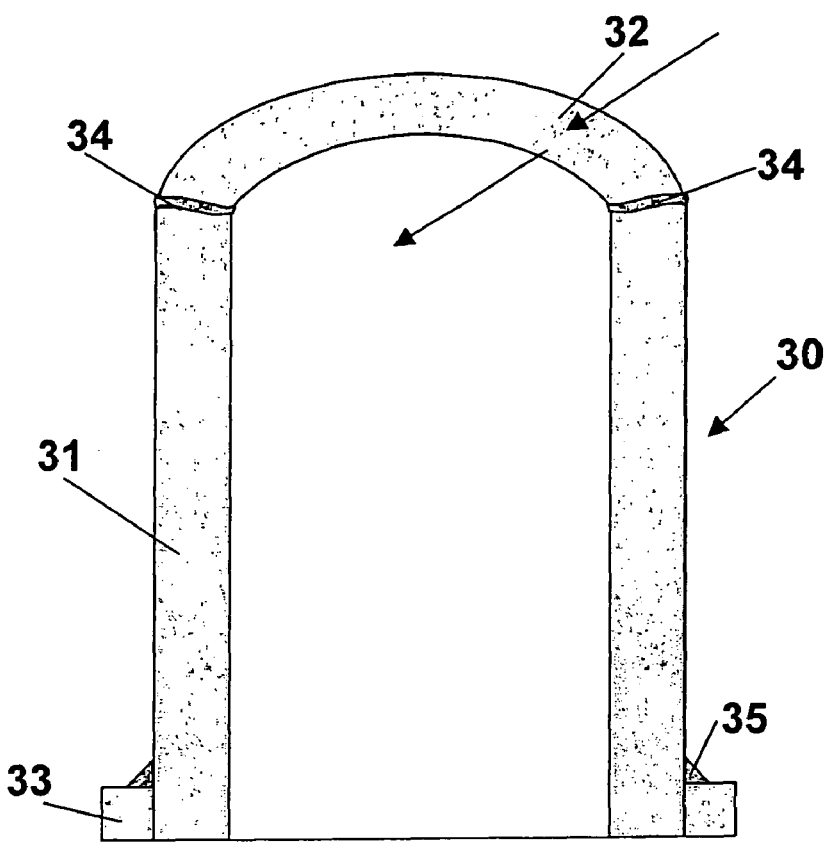
FIG. 3 shows another embodiment of the component assembly according to the invention in the form of a dome-shaped reactor shell assembled from individual parts.

FIG. 3 shows a dome-shaped bell jar 30 of an reactor used for etching or performing CVD processes in the manufacture of semiconductors. The bell jar 30 consists of a tube-shaped side part 31 made of transparent quartz glass, whose upper side is sealed in a gas-tight fashion by a dome-shaped covering element 32 which is also made of transparent quartz glass, and on whose lower side a flange 33 made of opaque quartz glass is provided. The covering element 32 and the flange 33 are fixed to the side part 31 by means of bonding connections using the slurry described above followed by vitrification by means of a burner. The bonding connection between the side part 31 and the covering element 32 is provided in the form of a butt seam weld 34, and the connection between the flange 33 and the side part 31 is provided in the form of a fillet weld 35. The seam connections each consist of pure SiO$_2$ and therefore of a material that is generic with regard to the reactor shell components, and have a mean specific density of approximately 2.20 g/cm$^3$.

Quartz glass containers of any shape and size can be assembled in a similar fashion from simple plate-shaped, ring-shaped and circular individual elements. Pertinent examples include cuvettes made of quartz glass or tanks for the reception of etching agents.

Figure 4:
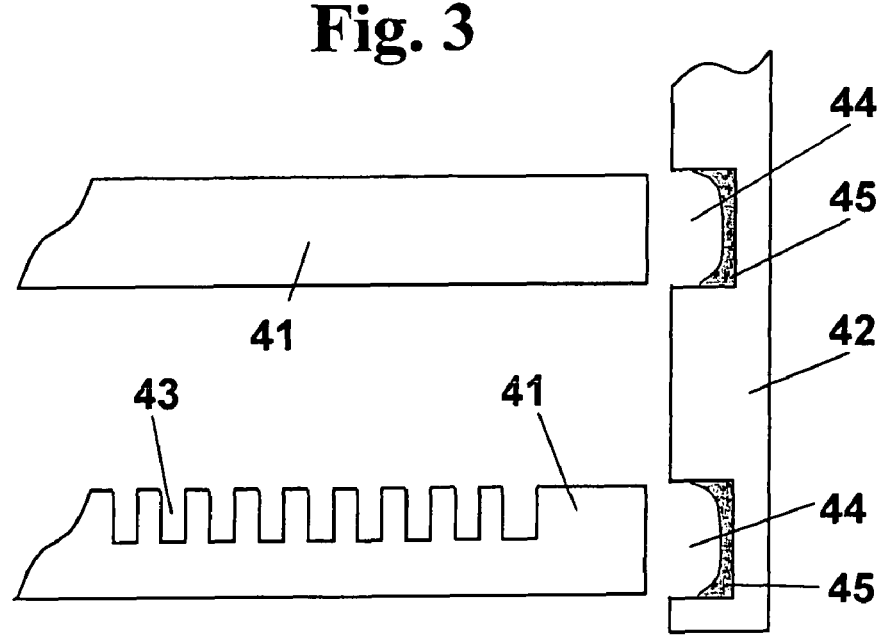
FIG. 4 shows a procedural step for the assembly of several individual parts to form a wafer carrier by means of the method according to the invention.

FIG. 4 shows in a schematic fashion a procedural step for assembling a wafer carrier from several individual parts by means of the method according to the invention. The wafer carrier consists of side flanges 42 made of transparent quartz glass arranged opposite each other (one of the side flanges is shown in FIG. 4), which are connected by means of fins 41. The fins 41, which serve to bear wafers and are provided with transverse slits 43 for this purpose, are connected to the side flanges 42 by means of the method according to the invention using a SiO$_2$-containing bonding mass. For this purpose, the side flanges are provided with circular bore holes 44, into which bonding mass 45 in the form of the slurry described above is filled prior to inserting the fins 41. The bonding sites thus generated are then dried and subsequently vitrified to transparence by a burner flame such that the bonding sites thus obtained consist of a material that is generic with regard to the wafer carrier, and have a mean specific density of approximately 2.20 g/cm$^3$.

Figure 5A:
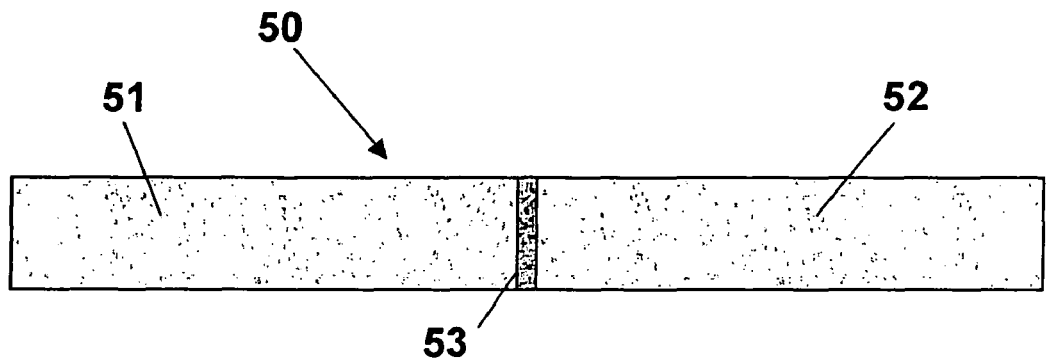
FIG. 5a shows an embodiment of the component assembly according to the invention in the form of quartz glass plates connected to each other in a butt-like fashion.

FIG. 5a shows a section of a transparent quartz glass plate 50 with a thickness of 30 mm which is assembled from individual parts 51, 52. The individual parts 51, 52 are connected to each other by means of butt seams 53 made of transparent quartz glass. The butt seams 53 are generated by fixing in a built-like fashion the quartz glass plates 51, 52 with respect to each other such that a gap of approximately 1.5 mm remains, and then filling the gap with an SiO$_2$ slurry. The slurry is allowed to dry for 5 hours in an air atmosphere (as described by means of FIG. 1) and is then vitrified by means of an oxyhydrogen burner flame. The upper side of the composite thus obtained is subsequently ground and polished to be even such that an optically homogeneous quartz glass plate 50 is obtained. The seam connections each consist of pure SiO$_2$ and therefore of a material that is generic with regard to the individual parts 50, 51, and have a mean specific density of approximately 2.20 g/cm$^3$.

In this fashion, it is possible to produce quartz glass plates with large surface areas without resorting to hot forming processes.

Figure 5B:
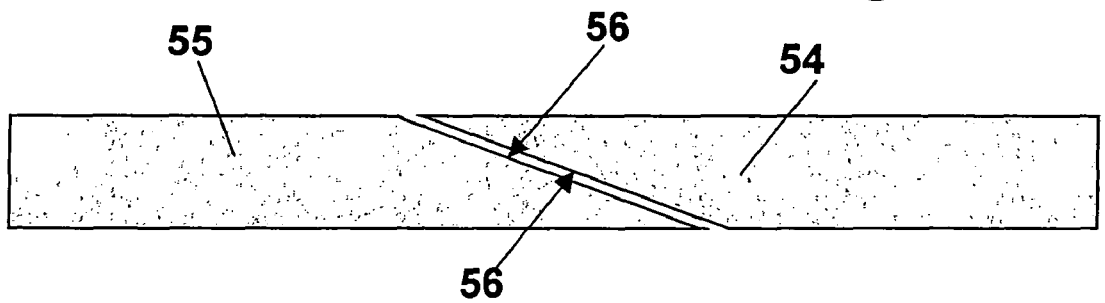
FIG. 5b shows another embodiment of quartz glass plates connected to each other in a butt-like fashion.

FIG. 5b shows an alternative bonding technique for the manufacture of quartz glass plates with large surface areas by placing against each other in a butt-like fashion and fixing smaller plate elements 54, 55. In the process, the plate elements 54, 55 are each provided with beveled edges 56. The bevels are fixed in position with respect to each other, as shown in FIG. 5b, and SiO$_2$ slurry is filled into the gap. After drying and vitrification of the slurry, as shown above by means of FIG. 5a, a transparent quartz glass plate is obtained which is particularly resistant to bending stress due to the size and arrangement of the bonding sites.

Figure 6:
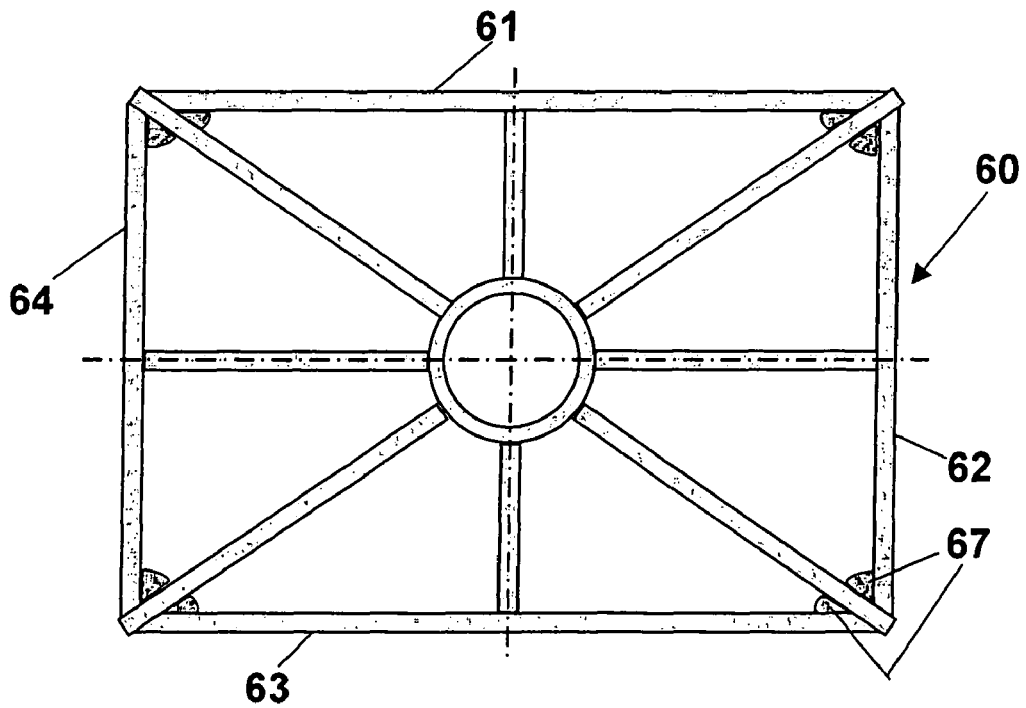
FIG. 6 shows a top view of a component assembly composed from plate- and tube-shaped individual elements, in the form of a lightweight reflector carrier.

FIG. 6 shows in a schematic fashion a component assembly composed from plate- and tube-shaped individual elements, in the form of a lightweight reflector carrier 60. Reflector carriers of this type are used in telescopes, for example. Aside from their lightweight design, a particular focus is placed on the dimensional stability upon changes of the temperature. Due to its low thermal expansion coefficient, quartz glass is well-suited to provide the reflector carrier. The low weight is achieved by assembling the reflector carrier from simple, lightweight machined parts made of quartz glass. However, welding the machined parts made of quartz glass together causes deformation of the reflector carrier. If the machined parts made of quartz glass are glued to each other according to state-of-the-art techniques, the non-adapted difference in the thermal expansion coefficients of adhesive and quartz glass leads to deformations during operation.

The method according to the invention is the first to provide a gluing technique for the manufacture of lightweight reflector carriers made of machined parts made of quartz glass, whereby the carriers are not associated with a risk of deformation upon variations in the temperature since the adhesive is generic with regard to the quartz glass of the machined parts.

FIG. 6 shows in a schematic fashion a telescope reflector carrier 60 made of plate elements 61 to 64, which are connected to each other by means of fins 65 and a ring element 66. The connection is afforded by fillet welds 67 (of which only a small number is shown in schematic fashion) between the respective machined parts. The method according to the invention described above is used to generate the fillet welds. The fillet welds 67 are sintered at as low a temperature as possible in order to avoid deformation. They are opaque, each consist of pure $SiO_2$ and therefore of a material that is generic with regard to the plate elements 61 to 64, and have a mean specific density of approximately 2.10 g/cm³.

In the embodiment of the component assembly according to the invention in accordance with FIG. 7, which is provided in the form of a laboratory device 70, a ground joint part 71 with a conical ground joint is prepared first, and then connected to a bushing-shaped shaft 72 by bonding using a $SiO_2$-containing bonding mass, which is provided in the form of a circumferential fillet weld 73.

The circumferential fillet weld 73 consist of pure $SiO_2$ and therefore of a material that is generic with regard to the ground joint part 71 and the shaft 72, and has a mean specific density of approximately 2.20 g/cm³.

In identical or similar fashion, other laboratory devices made of quartz glass can be assembled from simple individual elements.

FIG. 8 shows a side view of a section of a component assembly 80 according to the invention in the form of quartz glass tubes 81, 82 which are arranged coaxial with respect to each other and are fixed on a quartz glass ring 83.

The quartz glass tubes 81, 82 are connected to each other by means of a $SiO_2$-containing bonding mass 84 according to the invention, and are simultaneously fixed in an annular groove of the quartz glass ring 83.

The fixing mass is opaque and consists of pure $SiO_2$. Hence, it is generic with regard to the quartz glass tubes 81 and 82, and has a mean specific density of approximately 2.10 g/cm³.

In identical or similar fashion, arrangements of coaxial quartz glass tubes, for example for the manufacture of chemical apparatus or for the manufacture of flame hydrolysis burners made of quartz glass, are manufactured, whereby it is also possible to dispense with the quartz glass ring 83.

FIG. 9 shows in a schematic fashion a preform 90 for the manufacture of optical fibers, zones of which are softened in a furnace 91 and thereby elongated to a strand 92. For the bracket of the preform, a holding cylinder 93 made of quartz glass is provided which is connected in a butt-like fashion to the upper front-face end of the preform 90. The bonding procedure according to the invention is used to generate this connection, whereby an all-around fillet weld is provided on the inside of the holding cylinder 93, and on the outer jacket, an all-around outer build-up made 95 made of partly opaque, partly transparent quartz glass is provided, which overlaps the abutment site. Fillet weld 94 and outer build-up 95 are generated by sintering and vitrification of a $SiO_2$ slurry layer by means of a burner flame, whereby only the outer areas of the slurry layer become completely vitrified. Thus, the composite is exposed to relatively little temperature strain as compared to attachment of the holding cylinder by melting and there is little impact on the preform 90.

Fillet weld 94 and outer build-up 95 each consist of pure $SiO_2$ and therefore of a material that is generic with regard to the preform 90, and have a mean specific density of approximately 2.15 g/cm³.

FIG. 10 shows a radial cross-section of an opaque quartz glass tube 100 comprising an internal tube 101 and an external tube 102, which both consist of transparent quartz glass. The internal tube 101 has an internal diameter of 50 mm and an external diameter of 54 mm. The external tube 102 has an internal diameter of 60 mm and an external diameter of 65 mm. The gap remaining between the quartz glass tubes 101, 102 with a gap width of 3 mm is filled with an opaque $SiO_2$-containing bonding mass 103 according to the present invention and serves the purpose, on the one hand, to connect the quartz glass tubes 101, 102 to each other and, on the other hand, to impart opacity on the tube composite 100, which serves to shield heat radiation.

The $SiO_2$-containing bonding mass 103 consist of pure $SiO_2$ and therefore of a material that is generic with regard to the quartz glass tubes 101, 102, and has a mean specific density of approximately 2.10 g/cm³.

In the embodiments of the component assembly according to the invention illustrated above, the individual components consist of non-doped quartz glass. Hence, the $SiO_2$-containing bonding mass used to effect the corresponding bonded connection ideally also consists of non-doped quartz glass in these cases. In the presence of one or multiple doping agents in the quartz glass of the components with an effect on the thermal expansion coefficient of quartz glass, the $SiO_2$-containing bonding mass is selected such that its thermal expansion coefficient and the temperature dependence thereof are similar to those of the component, and, in the case of components doped differently, preferably are between the corresponding expansion coefficients.

The application of the slurry between or onto the connecting surfaces of the components is subject to the influence of the flow properties of the slurry. The application of homogeneous layers to large surface areas is facilitated by a so-called dilatancy effect (Kelvin effect), whereas otherwise the so-called intrinsic viscosity or thixotropy is desired rather. The slurry property called intrinsic viscosity (thixotropy) is evident in that the viscosity of the slurry is reduced in dependence on the shearing rate (for example during stirring). This is related to diminished interactions between the amorphous $SiO_2$ particles due to the action of shear forces. After the elimination of the shear forces—when the slurry mass in contact with the connecting surfaces of the components is at rest—these interactions intensify again and lead to the formation of physical or chemical bonds between the amorphous $SiO_2$ particles of the slurry mass. The intrinsic viscosity of the slurry can be increased by adding coarser $SiO_2$ particles.

The invention claimed is:
1. A method for bonding components made of quartz glass using a substance to substance bond by forming an $SiO_2$-containing bonding mass between connecting surfaces of the components, said method comprising the following steps:
  (a) providing an aqueous slurry with a solid fraction of amorphous $SiO_2$ particles, said solid fraction having an $SiO_2$ content of at least 99.9 wt-%, the amorphous $SiO_2$ particles having particle sizes in a range of up to 500 μm, and the amorphous $SiO_2$ particles that have particle sizes in a range of between 1 μm and 50 μm constituting a majority by volume of the solid fraction, said aqueous slurry being derived by wet comminution of amorphous $SiO_2$ starting grains;
(b) forming a slurry mass between the connecting surfaces which are fixed in position with regard to each other;
(c) drying of the slurry mass; and
(d) solidifying the slurry mass by sintering and vitrifying the sintered slurry mass so as to form the $SiO_2$-containing bonding mass, the components to be bonded each having an $SiO_2$ content, and the bonding mass having an $SiO_2$ content differing from the $SiO_2$ content of the components to be bonded by at most 3 wt-%;
wherein the sintering is performed at a first heating temperature in a sintering furnace in which the components to be connected are placed and homogeneously heated; and
wherein the vitrification is performed at a second heating temperature higher than the first heating temperature using an additional directional heat source whose maximal heating effect is limited locally to the slurry mass.

2. The method according to claim 1, wherein the solidification comprises sintering of the slurry mass so as to form an at least partly opaque solidified bonding mass.

3. The method according to claim 2, wherein the sintering comprises a temperature treatment of the slurry mass at a temperature between 800° C. and 1,450° C.

4. The method according to claim 2, wherein the sintering comprises a temperature treatment of the slurry mass at a temperature below 1,450° C.

5. The method according to claim 1, wherein the solidification comprises vitrification of the slurry mass so as to form an at least partly transparent, solidified $SiO_2$-containing bonding mass.

6. The method according to claim 1, wherein the particle sizes of the amorphous $SiO_2$ particles are in the range of up to 100 μM.

7. The method according to claim 1, wherein the solids content of the slurry during the generation of the slurry mass between the connecting surfaces is at least 65 wt-%.

8. The method according to claim 1, wherein at least part of the amorphous $SiO_2$ particles is present in the form of porous granulate particles made of agglomerates of nano-scale, amorphous, synthetically-produced $SiO_2$ primary particles with a mean primary particle size of less than 100 nm.

9. The method according to claim 1, wherein an exposure time is provided between the formation of the slurry mass between the connecting surfaces being fixed in position with respect to each other, and the drying of the slurry mass.

10. The method according to claim 1, wherein the solids content of the slurry during the generation of the slurry mass between the connecting surfaces is at least 80 wt-%.

11. The method according to claim 1, wherein the solids content of the slurry during the generation of the slurry mass between the connecting surfaces is at least 85 wt-%.

12. The method according to claim 1 wherein said components are a tube-shaped side part and a dome-shaped covering element of a bell jar, and the $SiO_2$-containing bonding mass forms a weld between said tube-shaped side part and said dome-shaped covering element.

13. The method according to claim 12, wherein a further slurry mass is formed from the aqueous slurry between connecting surfaces of the side part and a flange of the bell jar, and vitrification of the slurry masses is provided by a burner.

14. The method according to claim 13, wherein the second $SiO_2$-containing bonding mass forms a fillet weld between the flange and the side part.

15. The method according to claim 14, wherein the tube shaped side part and the dome-shaped element are of transparent quartz glass.

16. The method according to claim 15, wherein the flange is of opaque quartz glass.

17. The method according to claim 12, wherein the weld is a butt seam weld.

18. The method according to claim 1, wherein, in said wet comminution, $SiO_2$ dissolves to a degree at which the slurry has a pH value in a range between 3 and 5.5.

19. The method according to claim 1, wherein the vitrification is performed by burners or infrared lasers.

20. The method according to claim 1, wherein the vitrification uses residual heat from the sintering.

* * * * *